United States Patent [19]

Südbeck et al.

[11] 4,455,987

[45] Jun. 26, 1984

[54] METHOD OF AND AN ARRANGEMENT FOR CONTROLLING RETURN QUANTITIES OF EXHAUST

[75] Inventors: Rainer Südbeck, Duisburg; Hans Baumgartner, Viersen; Eckehard Schmitz, Monchen-Gladbach, all of Fed. Rep. of Germany

[73] Assignee: Pierburg GmbH & Co. KG, Neuss, Fed. Rep. of Germany

[21] Appl. No.: 397,455

[22] Filed: Jul. 12, 1982

[30] Foreign Application Priority Data

Jul. 17, 1981 [DE] Fed. Rep. of Germany ....... 3128239

[51] Int. Cl.³ .............................................. F02M 25/06
[52] U.S. Cl. ..................................... 123/569; 123/571
[58] Field of Search ................................. 123/571, 569

[56] References Cited

U.S. PATENT DOCUMENTS

| 3,915,134 | 10/1975 | Young et al. | 123/569 |
|---|---|---|---|
| 4,373,497 | 2/1983 | Hamren | 123/569 |

FOREIGN PATENT DOCUMENTS

| 1964140 | 12/1969 | Fed. Rep. of Germany | 123/569 |
|---|---|---|---|
| 2658052 | 12/1976 | Fed. Rep. of Germany | 123/569 |
| 56-151252 | 11/1981 | Japan | 123/569 |
| 57-165654 | 10/1982 | Japan | 123/569 |
| 57-210156 | 12/1982 | Japan | 123/569 |

*Primary Examiner*—Wendell E. Burns
*Attorney, Agent, or Firm*—Max Fogiel

[57] ABSTRACT

A method and an arrangement for controlling exhaust return quantities of an automatic-ignition, internal combustion engine comprising a camshaft-driven piston injection pump and an exhaust control element in an exhaust return pipe. Pressure pulses occurring in an output pressure line of the injection pump during the injection-active delivery stroke are directly or indirectly detected as regards their pulse duration as the injection duration $T_E$ and their pulse intervals as the injection period $T_P$. A certain injection stroke or a certain quantity of fuel to be injected per work cycle may be assigned, pump-specific, to each pair of values of these quantities through a known pump stroke curve. To control the return quantity of exhaust in dependence upon the quantity of fuel injected, the dependence between the pairs of values of $T_E$, $T_P$ on the one hand, and control quantities for the return quantities of exhaust on the other hand, are stored in an at least two-dimensional identification field. Accordingly, it is possible for each pair of values of $T_E$, $T_P$ determined in operation to retrieve the associated control quantity for the return exhaust quantities and to use that control quantity for controlling an exhaust control element. If the reciprocal value of the injection period $T_P$ is proportional to the rotational speed, other operating parameters, such as pressures and/or temperatures, may also be taken into consideration in the determination of the particular control quantity for the return quantities of exhaust.

21 Claims, 4 Drawing Figures

METHOD OF AND AN ARRANGEMENT FOR CONTROLLING RETURN QUANTITIES OF EXHAUST

BACKGROUND OF THE INVENTION

This invention relates to a method of and an arrangement for controlling return quantities of exhaust in an automatic-ignition, internal combustion engine which is supplied by a camshaft-driven piston, injection pump and which comprises an element for controlling exhaust quantities associated with an exhaust return pipe.

It is known in connection with the control of the return of exhaust gases, that the fuel-to-air ratio can be regulated using a control variable in the form of the quantity of air taken in and can be varied by a throttle valve and determined by an air intake meter. The output quantity of the air intake meter is divided in a control unit by the rotational speed measured at a fuel injection pump. The value thus obtained is compared with a control quantity which corresponds to the position of the quantity regulator of the fuel injection pump and which represents a value for the quantity of fuel to be injected. The position of the quantity regulator of the fuel injection pump is corrected by a positioning element commensurate with the deviation in the two control quantities. Through its position, the throttle valve also influences the quantity of returned exhaust which—with the quantity of intake air throttled—is available for filling the remainder of the cylinders of the internal combustion engine. This known method is very complicated and relatively slow in its control behaviour because, in the event of any change in the position of the throttle valve, the required values are only adjusted after the dead time of the controlled system. Above all, an excessive return quantity of exhaust is in danger of producing a brief, but heavy build up of carbon.

An object of the present invention is to develop a method and an arrangement of the type referred to above such that an operationally effective control of return quantities of exhaust commensurate with requirements can be obtained by relatively simple and reliable measures.

SUMMARY OF THE INVENTION

According to the invention, there is provided a method of controlling return quantities of exhaust for an automatic-ignition internal cumbustion engine which is supplied by a camshaft-driven piston injection pump and which comprises an element for controlling quantities of exhaust associated with an exhaust return pipe, characterised in that pressure pulses occurring following the injection pump in an output pressure pipe thereof are directly or indirectly detected and their pulse duration per work cycle is determined as injection duration $T_E$ whilst their pulse repetition period per work cycle is determined as injection period $T_P$ and in that control quantities for return quantities of exhaust previously stored in an identification field at least in dependence upon the variables, injection duration $T_E$ and injection period $T_P$, are retrieved in accordance with the particular variables determined and used for controlling the exhaust return.

The method according to the invention has the major advantage that the injection duration $T_E$ and the injection period $T_P$ may be determined very easily from the fuel pressure pulses readily detected in the pressure line, so that the correct control quantities for the return quantity of exhaust may be quickly and reliably assigned through the stored identification field. It has been found that this method can be carried out very easily and inexpensively and, despite its extreme simplicity, provides for very good working conditions. Whereas storage of the identification field does not involve any problems and may be carried out with greater or lesser differentiation according to the particular requirements, evaluation of the pressure pulses in the pressure line of the injection pump has the significant advantage that no intervention need be made in the injection pump itself. The pressure pulses may be determined very easily and reliably, only their qualitative evaluation as regards their pulse beginnings and endings being important for determining the injection duration $T_E$ and the injection period $T_P$, the quantitative pulse amplitude being of no significance to the method according to the invention. In this way, it is possible by simple means very accurately to control the necessary return of exhaust gases.

In another embodiment of the invention, the pressure pulses may be directly detected in the output delivery pipe of the injection pump. Instead of this, the pressure pulses may also be indirectly detected by determining changes in the diameter and/or length of the output delivery pipe of the pressure pump or by determining the opening movements of an injection nozzle following the injection pump and provided with a closure member biassed in the closing direction. Since the critical factor is not the amplitude of the pressure pulses, but only their trend as a function of time, it is basically immaterial how the pressure pulses are detected. Accordingly, the choice of the particular method used for their determination may be made according to what is most favourable for the particular application in question.

In another embodiment, it is possible to store and retrieve the control quantities for the return quantities of exhaust gas in dependence upon individual pairs of values of the variables, injection duration $T_E$ and injection period $T_P$. In this connection, the reciprocal value of the injection period $T_P$ may be taken into account as a rotational speed. The control quantities for the return quantities of exhaust may be assigned to these pairs of values for any application in such a way that optimal operational behaviour is obtained.

In addition, it is also possible for the control quantities for the return quantities of exhaust to be stored and retrieved in dependence upon the quotient $T_E/T_P$—proportional to the quantity injected per work cycle—of the variables injection duration $T_E$ and injection period $T_P$. In this connection, it is particularly preferred to store and retrieve the control quantities for the return quantities of exhaust in additional dependence upon the rotational speed or the reciprocal value of the injection period $T_P$. The operational states of the internal combustion engine which are crucial for gauging the return of exhaust gases may be clearly determined from the above-mentioned quotient and the rotational speed. In this way, the necessary return quantity of exhaust gas may be adjusted quickly and with considerable accuracy.

In another embodiment of the invention, the control quantities for the return quantities of exhaust are stored and retrieved in additional dependence upon at least one other variable, such as the pressure and/or temperature. In this way, the effectiveness of exhaust return may be optimised and adapted more closely to the particular operating conditions and parameters.

It can be of advantage to determine the particular control quantity for the return quantities of exhaust by interpolation between the stored control quantities. In this way, the size of the stored identification field can be kept within reasonable limits whilst at the same time keeping the control of the return quantities of exhaust sufficiently accurate. The form which interpolation takes is abitrary and may be selected to meet the particular requirements.

According to a further aspect of the present invention there is also provided an arrangement for controlling return quantities of exhaust for an automatic-ignition internal combustion engine which is supplied by a camshaft-driven piston injection pump and which comprises an element for controlling quantities of exhaust associated with an exhaust return pipe, characterised by a sensor for connection to an injection system following its injection pump for generating first signals corresponding directly or indirectly to output fuel pressure pulses of the injection pump; by means for generating two signals which correspond to the variables injection duration $T_E$ and injection period $T_P$ per work cycle or to a combination thereof from the first signals, and by a control unit for processing the second signals, influencing an element which controls the quantities of exhaust and comprising an identification field memory in which the control quantities—to be retrieved—for the return quantities of exhaust are stored at least in dependence upon the second signals.

An arrangement of this form is relatively simple, and without necessitating any intervention with the injection pump, makes it possible readily to determine the trend of the pressure pulses as a function of time in order reliably to determine therefrom both the injection duration $T_E$ and the injection period $T_P$. With the aid of these times at least, the particular control quantity for the return quantities of exhaust required may be retrieved quickly, reliably and exactly from the identification-field memory. It is of very considerable importance that the arrangement according to the invention detects only the trend of the pressure pulses as a function of time and not their absolute value. It is merely necessary to detect when pressure pulses are present or exceed a certain pressure threshold which may be done very accurately using simple means.

In another preferred embodiment, the control unit is a microprocessor comprising an amplifier or controller on the output side connected to the element for controlling the quantities of exhaust. Whereas, in the first case, the control unit directly influences the control element for the quantities of exhaust through the amplifier, the control unit in the second case produces a control variable for the controller which in turn ensures that the control deviation in the control element for the quantities of exhaust is kept as small as possible. Considerable advantages are afforded by using a microprocessor as the control unit because an electronic component of this type is capable of performing a variety of functions rapidly and reliably despite its low cost and minimal space requirement. The same also applies in cases where the identification-field memory is preferably in the form of an at least two-dimensional ROM-memory. A two-dimensional ROM-memory has a high storage density and is capable of storing the data required for controlling exhaust return in large numbers and in a safe and easily retrievable form.

In addition, it is preferred to provide at least one additional operating parameter input of the microprocessor and a multi-dimensional ROM-memory in which the quantities for controlling the return quantities of exhaust are stored in additional dependence upon at least one other operating parameter, such as the pressure and/or temperature. By using the electronic components, it is readily possible to take into account further operating parameters of the type which enable the actual return quantities of exhaust to be better adapted to the demand required for optimal operation.

Basically, it is immaterial what means are used for determining the trend as a function of time of the pressure pulses occurring in the pressure line of the injection pump. In one very simple embodiment, a pressure sensor or a strain gauge is connected to the output delivery pipe of the injection pump. In the latter case, determination takes place indirectly through pressure-induced changes in the diameter or length of the delivery pipe. Instead of this, it is also possible to use a travel sensor which senses the opening movement of a closure member—biassed in the closing direction—of an injection nozzle following the injection pump. This travel sensor may, for example, operate inductively. In no case is there any need for intervention in the injection pump itself. Whereas the use of a pressure sensor or strain gauge merely involves very simple attachment to the delivery pipe, the use of the travel sensor pre-supposes modification of or intervention in the injection nozzle in order to be able to monitor the movement of the closure member.

BRIEF DESCRIPTION OF THE DRAWINGS

Embodiments of the present invention will now be described by way of example with reference to the accompanying drawings, in which.

DETAILED DESCRIPTION OF THE INVENTION

Figure 1:
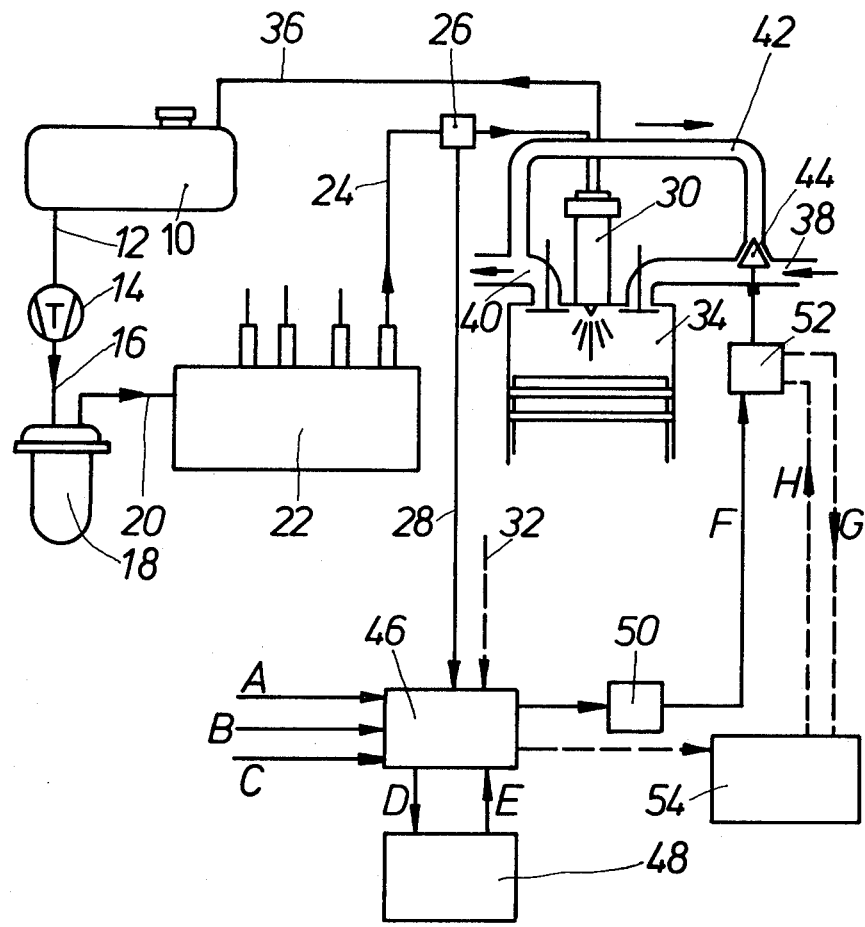
FIG. 1 is a diagrammatic general view of one embodiment of an arrangement according to the invention.

As shown in FIG. 1, a fuel tank 10 is connected by a suction pipe 12 to a delivery pump 14, an output pressure pipe 16 of which is connected via a fuel filter 18 to a suction pipe 20 of an injection pump 22. An output pressure or delivery pipe 24 of the injection pump 22 is provided with a pressure sensor 26 comprising a signal line 28 and leads to an inlet of a known injection nozzle 30 which in turn injects fuel into the working space of an automatic-ignition, internal combustion engine 34 during the effective delivery stroke of the injection pump 22. A fuel return pipe 36 connects the injection nozzle 30 to the fuel tank 10.

The pressure sensor 26, which could also be replaced by a strain gauge, delivers through its signal line 28 a signal corresponding to the pressure trend of pressure pulses as a function of time. This signal must be of such that the position and length of the pressure pulses as a function of time can be deduced therefrom so that it is sufficient for pulse peaks representing the presence of the edges of the pressure pulses in the delivery pipe 24 to be transmitted through the signal line 28.

The injection nozzle 30 comprises a spring-biassed, displaceable closure member (not shown) which, during the actual delivery or injection stroke of the injection pump 22, releases a calibrated nozzle opening and closes the return pipe 36. In cases where the displaceable closure member is, for example, inductively coupled to a travel sensor which senses its opening movement there is no need for the pressure sensor 26 with its signal line 28. A signal line 32 connected to the travel sensor and shown in dashed lines in FIG. 1, is used instead. This signal line 32 also relays signals representing the occurrence of the edges of the pressure pulses as a function of time.

The working volume of the automatic-ignition, internal combustion engine 34 is connected both to an air intake pipe 38 and an exhaust manifold 40. An exhaust return pipe 42 leads from the exhaust manifold 40 outside the working volume to the air intake pipe 38. The free flow cross-section of the exhaust return pipe 42 is variable by means of a displaceable closure member 44 which, in the present case, is situated at the opening of the exhaust return pipe 42 into the air intake pipe 38 and which is designed to be moved by a control member 52 for the quantity of exhaust.

The signals from the signal line 28, or alternatively from the signal line 32 pass to a microprocessor 46 of a computer-memory unit. The injection duration $T_E$ per work cycle and the injection period $T_P$ per work cycle are determined from the signals obtained either as individual or as combined quantities which are delivered as retrieval signals D to an electronic ROM memory 48 in which the dependences between the injection duration $T_E$ and the injection period $T_P$ on the one hand, and the control quantities for the return exhaust quantities on the other hand, are stored in an at least two-dimensional identification field. The signal E corresponding to these control quantities passes from the ROM memory 48 to the microprocessor 46 which in turn transmits a valve control signal F through an amplifier 50 to an exhaust control member 52. Alternatively, it is possible, as shown in dashed lines in FIG. 1, for the microprocessor 46 to deliver a control variable to a controller 54 which in turn applies a valve regulating signal H to the exhaust control member 52. A valve positioning signal G passes from the exhaust control member 52 to the controller 54 where a prescribed value/actual value comparison is made.

Other input signals A, B, C representing, for example, engine temperature, ambient temperature, pressure and the like, may optionally be delivered to the microprocessor 46. The control quantities E for the return exhaust quantities may be modified by those signals. Instead of this, it is also possible to use a multi-dimensional ROM memory 48 in which the dependences of the control quantities for the return exhaust quantities on the above-mentioned input signals and on other input signals are stored. In connection with allowing for the rotational speed, it is pointed out that the reciprocal value of the injection period $T_P$ as delivered to the microprocessor 46 gives the rotational speed.

Figure 4:
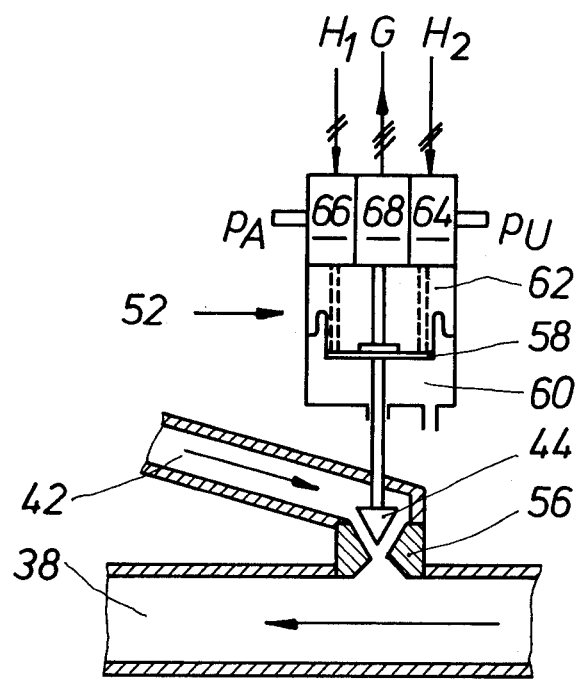
FIG. 4 is a diagrammatic section through an embodiment of an exhaust control element influenced by the arrangement according to the invention.

By means of its closure member 44, the exhaust control element 52, which may also be constructed, for example, as shown in FIG. 4 and which will be described in more detail hereinafter, ensures that the free flow cross-section of the exhaust return pipe 42 is adapted to the particular demand for return exhaust by corresponding positioning of the closure member 44. Activation of the exhaust control element 52, which may be formed, for example, by an electromagnetic valve, may be carried out in different ways. For example, a current corresponding to the particular control quantity is passed through a magnetic coil or, alternatively, the valve is intermittently operated with a suitable pulse duty factor. Apart from this, other forms of activation may be used.

In the present case, the injection pump 22 is shown, for example, as a series injection pump. However, other types of injection pumps, for example, distributor injection pumps, may also be used.

As already known, the piston injection pump 22 driven by a camshaft of the internal combustion engine has a constant piston stroke and an effective delivery stroke dependent upon the particular angular position of the piston. This angular position or the delivery stroke is variable by means of a quantity regulating element in the form of a control rod which may be adjusted, for example, by a lever commensurate with the load or with the required torque. In this connection, control may take place through a standard controller or even by means of an electrical controller which takes into account control quantities such as, for example, the quantity of air taken in or the rotational speed. Depending on the position of the control edge of a pump piston of the injection pump, the beginning or the end of the delivery stroke coincides with a certain position of the driving camshaft whereas the end or the beginning of the delivery stroke is variable in accordance with the position of the control rod.

Figure 3:
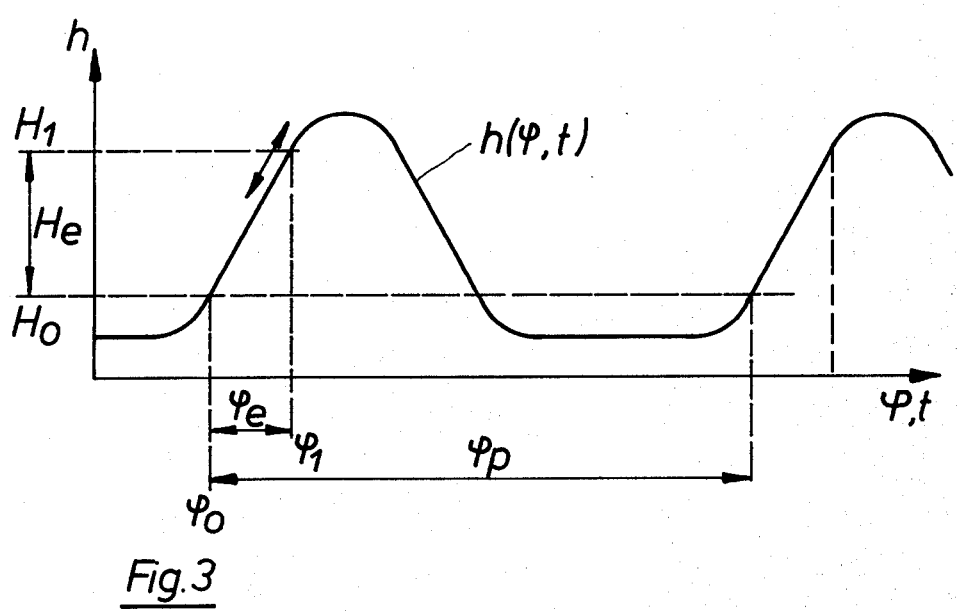
FIG. 3 is a graph showing the dependence of the stroke curve of the piston injection pump upon the angle of rotation of the driving camshaft.

During the rotation of the camshaft of a piston injection pump, i.e. during the change in its camshaft angle $\phi$ as a function of time, the actual stroke h of the pump piston changes between minimum and maximum values (not identified by references), for example, in accordance with the stroke curve illustrated in FIG. 3. In the case of an injection pump in which the control edge of the pump piston is situated underneath, the actual delivery stroke always begins at a certain camshaft angle $\phi_O$ and ends at a variable camshaft angle $\phi_1$ according to the required power output of the engine, for example, in dependence upon the particular position of the accelerator pedal. Accordingly, the actual delivery of fuel takes place in the region of the injection angle $\phi_E$. The effective injection angle $\phi_E$ is relatively small or relatively large, according to the angular position of the pump piston. The fuel return of the injection pump is closed for the duration of the injection angle $\phi_E$. In the case of an injection pump in which the control edge of the pump piston is situated on top, the conditions are reversed so that the fuel return of the injection pump in dependence upon the angular position of the piston is closed beyond a variable $\phi_O$ and re-opened beyond a fixed $\phi_1$.

As can be seen from FIG. 3, the pump piston completes an effective delivery stroke $H_E$ during the injection angle $\phi_E$, this effective delivery stroke $H_E$ deriving from the difference between the variable maximum stroke $H_1$ at the end of injection and the fixed minimum stroke $H_O$ at the beginning of injection. One such injection stroke $H_E$ occurs once during each period $\phi_P$ of the camshaft angle. This angle $\phi_P$ is measured between two fixed beginning or end points of the successive delivery stroke phases and, in the present case, between the beginnings of two successive delivery stroke phases.

Figure 2:
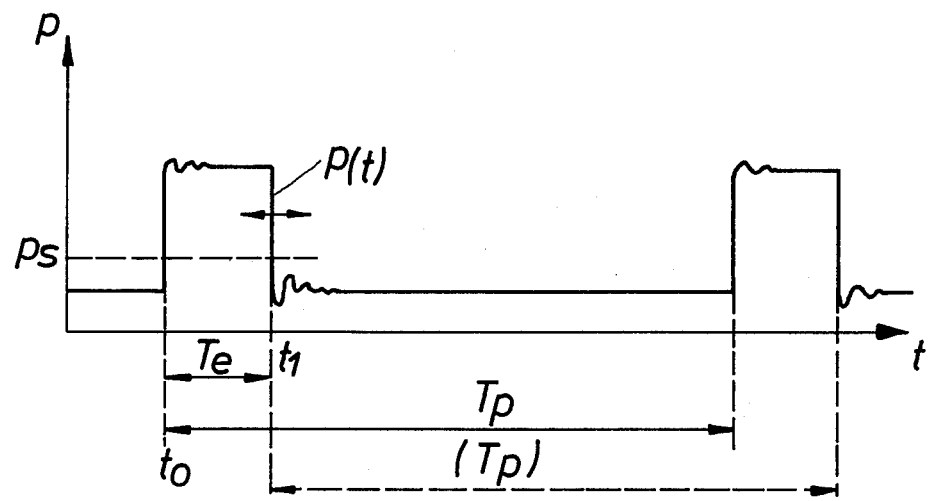
FIG. 2 is a graph showing the pressure trend as a function of time of the fuel in the outlet pressure line of the injection pump.

During the delivery stroke phases of the injection pump, the fuel return is closed so that the fuel passes into the output delivery pipe 24 from which it is injected via a calibrated injection nozzle of the injection valve 30. Accordingly, an excess pressure builds up in the delivery pipe during the actual delivery stroke phases, as shown in FIG. 1. The pressure curve p (t) always shows pressure pulses rising beyond a threshold pressure $P_S$ when the injection pump 22 is in its actual delivery stroke phase. As shown in FIG. 2, the pressure pulse begins at the time $t_O$ and ends after a variable injection duration $T_E$ at the time $t_1$. Accordingly, the times $t_O$ and $t_1$ coincide with the occurrence of the camshaft angles $\phi_O$ and $\phi_1$. Corresponding to the periodic stroke curve in FIG. 3 with the periodic camshaft angle $\phi_P$, the pressure pulses also occur periodically with the period $T_P$. Where an injection pump with a fixed injection start at $\phi_O$ is used, this period $T_P$ is measured between the initial or ascending sides of two successive pressure pulses. Where an injection pump with a fixed injection start at $\phi_1$ is used, the injection period $T_P$ is measured between the terminal or descending sides of successive pressure pulses, as indicated in FIG. 1 by a dashed line double arrow.

The amount of fuel injected per working cycle of the injection pump is represented by the product of the pump piston area and the effective delivery or injection stroke $H_E$. This applies to all piston injection pumps with the control edge of the pump piston arranged either underneath or on top.

The following relation exists between the injection duration $T_E$ and injection period $T_P$ determined from the pressure pulses on the one hand, and the camshaft angles on the other hand:

$$T_P/\phi_P = T_E/\phi_E$$

From this, the injection angle is obtained as follows:

$$\phi_E = \phi_P \cdot T_E/T_P$$

Since the periodic camshaft angle $\phi_P$ is known and amounts to, for example, 360°, the injection angle $\phi_E$ may be determined using the quotient $T_E/T_P$. Since on the other hand, the beginning of injection is fixed at $\phi_O$, a certain injection stroke $H_E$ derives from the pump-specific stroke curve h with the determined $\phi_E$, a certain quantity of fuel for injection per work cycle being assigned to that injection stroke $H_E$ through a certain pump piston area. Accordingly, it is possible to assign a certain quantity of fuel for injection to each $T_E/T_P$ ratio. At the same time, the rotational speed n may be calculated from the injection period $T_P$ determined by formation of the reciprocal value.

Accordingly, it is possible to assign a certain return quantity of exhaust to each quantity of fuel to be injected by storing a certain control quantity for the return exhaust quantities in the ROM-memory 48 in association with each pair of values of $T_E$ and $T_P$ and retrieving that control quantity as and when required. The memory identification field of the ROM-memory 48 may be two-dimensional or multi-dimensional and may also take into account other parameters such as, for example, temperatures, pressures or rotational speeds proportional to the reciprocal injection period. Thus, by determining the particular pairs of values of $T_E$ and $T_P$ of each quantity of fuel for injection, optionally taking other operating parameters into account, it is possible to assign a certain return quantity of exhaust and to adjust that quantity by correspondingly positioning the closure member 44 or the free flow cross-section of the exhaust return pipe 42.

As shown in FIG. 4, the exhaust control element 52 may be formed, for example, by an electromagnetically controlled, pneumatic diaphragm box of which the displaceable, conical closure member 44 is associated with a correspondingly conical valve seat 56 at the opening of the exhaust return pipe 42 into the air intake pipe 38. The diaphragm box contains a displaceable diaphragm 58 which is mechanically connected to the closure member 44 and which divides the interior of the diaphragm box into a ventilated diaphragm compartment 60 and a control pressure chamber 62. The diaphragm 58 or a diaphragm plate connected thereto, is biassed by a diaphragm spring (shown in dashed lines without a reference numeral) in the closing direction of the closure member 44. A variable control pressure may be admitted to the control pressure chamber 62. For example, it is possible to admit to the control pressure chamber 62 through a magnetic valve 64 a reduced pressure $P_U$, as from the intake pipe of the internal combustion engine, and/or through a magnetic valve 66 the ambient pressure $P_A$. Accordingly, it is possible—depending on the position of the magnetic valves 64, 66—to establish in the control pressure chamber 62 a control pressure variable between the reduced pressure $P_U$ and the ambient pressure $P_A$. For example, the magnetic valves 64, 66 may be activated from the controller 54 in FIG. 1 by valve regulating signals $H_1$, $H_2$ in order to move the closure member 44 into a position corresponding to the particular control quantity for the return quantities of exhaust. In addition, the diaphragm box accommodates a position repeater 68 which is mechanically coupled to the diaphragm 58 and which produces a valve positioning signal G and transmits to the controller 54. This position repeater may comprises, for example, a potentiometer through which an electric current flows and of which the tap adjusted to correspond to the position of the diaphragm incorporates the valve positioning signal G as a variable-position voltage signal. The exhaust control element 52 shown in FIG. 4 is intended purely as an example and may be modified in several ways. This would be the case, for example, if the controller 54 shown in FIG. 1 were to be left out and if activation were to take place solely through the amplifier 50, i.e. a valve positioning signal G.

The method and arrangement according to the invention lend themselves to modification in numerous ways. In this connection, however, it is important that the return quantities of exhaust can be controlled very easily in dependence upon the injection duration $T_E$ and the injection period $T_P$ and, optionally, other parameters, commensurately with the particular quantity of fuel to be injected, by retrieving control quantities for the return quantities of exhaust stored in an identification field at least in dependence upon $T_E$, $T_P$ after the particular pairs of values of $T_E$ and $T_P$ have been determined very easily from the pressure pulses in the pressure line of the injection pump.

What is claimed is:

1. A method of controlling return quantities of exhaust for an automatic-ignition internal combustion engine supplied by a camshaft-driven piston injection pump, comprising the steps of: controlling quantities of exhaust associated with an exhaust return pipe; detecting pressure pulses occurring following the injection pump in an output pressure pipe; determining their pulse duration per work cycle as injection duration $T_E$, and determining their pulse repetition period per work cycle as injection period $T_P$; and retrieving control quantities for return quantities of exhaust previously stored in an identification field at least in dependence upon the variables, injection duration $T_E$ and injection period $T_P$, in accordance with particular variables determined and used for controlling the exhaust return.

2. A method as claimed in claim 1, wherein the pressure pulses in the output delivery pipe of the injection pump are directly detected.

3. A method as claimed in claim 1, wherein the pressure pulses are indirectly detected by determining changes in the diameter and/or length of the outlet delivery pipe of the injection pump.

4. A method as claimed in claim 1, wherein the pressure pulses are indirectly detected by determining the opening movements of an injection nozzle following the injection pump and provided with a closing member biassed in the closing direction.

5. A method as claimed in claim 1, wherein the control quantities for the return quantities of exhaust are stored and retrieved in dependence upon individual pairs of values of the variables, injection duration $T_E$ and injection period $T_P$.

6. A method as claimed in claim 1, wherein the control quantities for the return quantities of exhaust are stored and retrieved in dependence upon the quotient $T_E/T_P$—proportional to the quantity injected per work cycle—of the variables, injection duration $T_E$ and injection period $T_P$.

7. A method as claimed in claim 6, wherein the control quantities for the return quantities of exhaust are stored and retrieved in additional dependence upon the rotational speed.

8. A method as claimed in claim 6, wherein the control quantities for the return quantities of exhaust are stored and retrieved in additional dependence upon the reciprocal value of the injection period $T_P$.

9. A method as claimed in claim 1, 5, 6 or 7, wherein the control quantities for the return quantities of exhaust are stored and retrieved in additional dependence upon at least one other variable.

10. A method as claimed in claim 1, 5, 6 or 7 wherein the control quantities for the return quantities of exhaust are stored and retrieved in additional dependence upon the pressure and/or temperature.

11. A method as claimed in claim 1, 5 or 6, wherein the particular control quantity for the control quantities of exhaust is determined by interpolation between the stored control quantities.

12. An arrangement for controlling return quantities of exhaust for an automatic-ignition internal combustion engine which is supplied by a camshaft-driven piston injection pump and which comprises an element for controlling quantities of exhaust associated with an exhaust return pipe, characterised by a sensor for connection to an injection system following its injection pump for generating first signals corresponding directly or indirectly to output fuel pressure pulses of the injection pump; by means for generating two signals which correspond to the variables injection duration $T_E$ and injection period $T_P$ per work cycle or to a combination thereof from the first signals, and by a control unit for processing the second signals, influencing the element which controls the quantities of exhaust and comprising an identification—field memory in which the control quantities—to be retrieved—for the return quantities of exhaust are stored at least in dependence upon the second signals.

13. An arrangement as claimed in claim 12, wherein the control unit is a microprocessor having an amplifier on the output side connected to the element for controlling the quantities of exhaust.

14. An arrangement as claimed in claim 12, wherein the control unit is a microprocessor having a controller on the output side connected to the element for controlling the quantities of exhaust.

15. An arrangement as claim in claim 12, wherein the identification-field memory is in the form of an at least two-dimensional ROM-memory.

16. An arrangement as claimed in claim 13 or 14, comprising at least one additional operating parameter input for the microprocessor and a multidimensional ROM-memory in which the control quantities for the return quantities of exhaust are stored in additional dependence upon at least one other operating parameter.

17. An arrangement as claimed in claim 13 or 14 comprising at least one additional operating parameter input for the microprocessor and a multi-dimensional ROM-memory in which the control quantities for the return quantities of exhaust are stored in additional dependence upon the pressure and/or temperature.

18. An arrangement as claimed in claim 12, wherein a pressure sensor is provided for connection to an output delivery pipe of the injection pump.

19. An arrangement as claimed in claim 12, wherein a strain gauge is provided for connection to an output delivery pipe of the injection pump.

20. An arrangement as claimed in claim 12, wherein a travel sensor is provided for determining the opening movement of a closure element—biassed in the closing direction—of an injection nozzle following the injection pump.

21. An arrangement as claimed in claim 20, wherein said travel sensor is an inductive travel sensor.

* * * * *